United States Patent [19]

Galper

[11] Patent Number: 4,608,165

[45] Date of Patent: Aug. 26, 1986

[54] LIQUID SURFACE SKIMMING TROUGH ASSEMBLY

[75] Inventor: Sam Galper, Islington, Canada

[73] Assignee: Samdor Engineering Limited, Islington, Canada

[21] Appl. No.: 721,041

[22] Filed: Apr. 8, 1985

[51] Int. Cl.$^4$ ............................................. E02B 15/04
[52] U.S. Cl. ..................................... 210/232; 210/525
[58] Field of Search ............... 210/525, 241, 922, 923, 210/232; 384/276, 281, 295, 296, 286, 289, 290, 297, 299, 300

[56] References Cited

U.S. PATENT DOCUMENTS

2,264,912 12/1941 Kupper ............................... 210/525
4,290,887 9/1981 Brown et al. ....................... 210/525

*Primary Examiner*—Frank Sever
*Attorney, Agent, or Firm*—Sim & McBurney

[57] ABSTRACT

A rotatable skimming trough assembly is used for skimming a liquid layer from an upper region of a tank contained liquid. The trough assembly comprises a trough extending across a portion of a tank and a bearing for rotatably mounting each end of the trough in the tank. The trough includes a cylindrical bearing sleeve which is mounted within the bearing. The bearing includes internally of its housing a plurality of rollers on which the cylindrical bearing sleeve rests. A sealing device defines a seal cavity for the rollers within which an non-emulsifying grease or oil is provided. The bearing arrangement for the trough assembly provides for extended life with minimal chance of freeze up or seizing of the bearings for the assembly.

24 Claims, 12 Drawing Figures

LIQUID SURFACE SKIMMING TROUGH ASSEMBLY

FIELD OF THE INVENTION

This invention relates to a rotatable skimming trough assembly for removing scum and the like from the upper region of a tank contained liquid including improved bearing assemblies for mounting the trough in a tank and an operator for rotating the trough.

BACKGROUND OF THE INVENTION

In liquid purification systems, which involve various types of settling tanks, it is often necessary to remove impurities from the upper regions of the tank contained liquid, such as scum, floating debris, oil layers and the like. Removal of this upper layer may be accomplished by a variety of techniques including inducing liquid flow patterns which cause the upper layer of scum or foam to flow over a weir, mechanical moving rakes which are drawn across the liquid surface and by rotatable scum removing troughs. The scum removing trough is normally used in situations which require infrequent removal of scum and other floating debris and which are normally partially immersed in the contained liquid of the tank. Due to the infrequent use of a skimming trough, it is normally operated by hand by rotating the trough up to approximately 90° which lowers the opening of the trough into the upper region of the contained liquid to remove adjacent debris and unwanted layers of liquid. The trough is rotated back to its upright position allowing the skimmed liquid and debris to flow out of the trough through an outlet at one end of the trough.

Examples of such trough skimmers are disclosed in U.S. Pat. Nos. 2,220,959, 2,337,859, 2,455,338 and 3,419,153. The significant problem with these skimming trough arrangements and with all other known skimming trough arrangements is the manner in which the trough ends or intermediate portions are mounted within the settling tanks. Due to the infrequent operation of the skimming troughs, it is thought that the simplest of bearing structures will do. However, it has been found that, in using such trough arrangements over extended times, such as five to ten years, the bearings seize and, therefore, require replacement. This seizure is usually caused by one metal surface abrading against another metal surface, such as the bearing arrangement disclosed in U.S. Pat. No. 3,419,153. In that arrangement, the bearing surfaces are provided by contacting metal structures of the bearing face and the trough. Such arrangements are very rigid and do not provide for flexibility in either axial movement and/or sloping of the trough. The tilting of the trough is necessary to ensure that skimmed liquid flows to the outlet end of the trough. Axial movement in the trough is usually induced by thermal expansion and contraction in the trough due to change in ambient temperature, since these devices are commonly used in the out of doors. The sealing arrangement is such that the bearing surfaces are exposed to the contained liquids. This can result in corroding of the bearing surfaces further adding to the seizing of the bearings.

Another difficulty with respect to sealing is that any water in the contained liquids, should it seep into the bearing arrangement, can freeze in cold temperatures. This precludes rotation of the trough to remove scum from the upper surface of the settling tank. This requires heating of the bearings to thaw them for use.

SUMMARY OF THE INVENTION

The trough assembly, according to this invention, has a bearing assembly which assures reliable operation over many years of use. The trough assembly comprises a trough of a length to extend across at least a portion of the tank where the bearing means mounts each end portion of the trough to a structure of a tank. A cylindrical bearing sleeve is associated with each of the trough end portions. The cylindrical bearing sleeve has an outer surface concentric with an axis of rotation for the trough.

The bearing means comprises a housing having an opening through which the trough cylindrical bearing sleeve extends. At least three rollers are mounted in the housing and arranged to contact the cylindrical bearing sleeve. The rollers are arranged about the trough axis of rotation with at least one roller in the upper region of the housing when supporting the trough on a tank. Each of the rollers rotates about an axis which is generally parallel with the trough axis of rotation.

Means is provided for sealing the rollers. The sealing means extends around the housing and in circumferential contact with the cylindrical bearing sleeve outer surface to define a sealed cavity between the housing and the sleeve outer surface. Means is associated with the bearing means on the trough for permitting insertion into the cavity of a substance for resisting migration through the sealing means of impurities from tank contained liquid. The trough assembly includes means to facilitate rotation of the trough about its axis of rotation and for locking the trough in any desired set position.

According to a preferred aspect of the invention, the sealing means is adapted to permit axial movement and/or sloping of the trough cylindrical bearing sleeve.

According to another preferred aspect of the invention, the bearing housing is split into two half sections and means is provided for releasably securing the half sections together. Such an arrangement facilitates, depending upon the bearing means used, assembly of the trough onto the tank structure.

BRIEF DESCRIPTION OF THE DRAWINGS

Preferred embodiments of the invention are shown in the drawings wherein.

DETAILED DESCRIPTION OF THE PREFERRED EMBODIMENTS

Skimming troughs are used in a variety of situations in removing an upper layer from a tank or the like of contained liquid. For example, the apparatus, according to this invention, may be used to remove a layer of scum from sludge settling tanks as commonly used in sewage treatment plants and other waste disposal plants. The settling tanks may include devices for urging the upper layer of scum and floating debris towards the skimming trough. The system is also used in water purification where an upper floating layer of oils and other scum can be removed by the trough system, where the bearing arrangement is designed for minimizing contamination of the purified water in a water treatment system.

Figures 1, 3, 4:
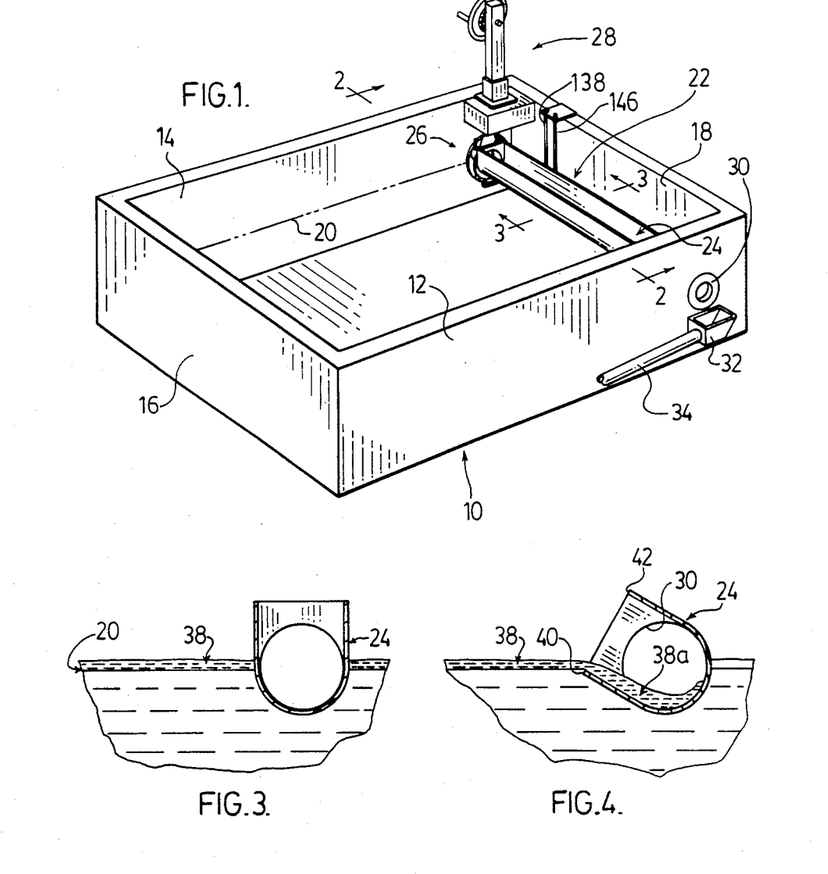
FIG. 1 is a perspective view of a settling tank having a trough assembly of this invention mounted therein.
FIG. 3 is a section along the lines 3—3 of FIG. 1 showing the trough according to a preferred embodiment of this invention partially immersed in tank contained liquid.
FIG. 4 shows the trough of FIG. 3 rotated to the extent to skim an upper layer of liquid of the tank contained liquid.

With respect to the preferred arrangement for the invention, as shown in FIG. 1, a settling tank 10 has side walls 12 and 14 with end walls 16 and 18. The tank may have varying depths depending upon its use as a settling tank where the liquid upper level is generally indicated by dashed line 20. Mounted to opposing walls 12 and 14 is the trough assembly generally designated 22. The trough assembly consists of a trough 24 mounted at its ends by bearing assemblies 26 which are secured to the inner surfaces of the opposing walls 12 and 14. A device generally designated 28 is used to rotate the trough 24 for purposes of collecting and removing an upper layer from the liquid 20. The trough 24 terminates at an outlet port 30. The effluent therefrom falls into collector 32 and is removed by drain 34.

Figure 2:
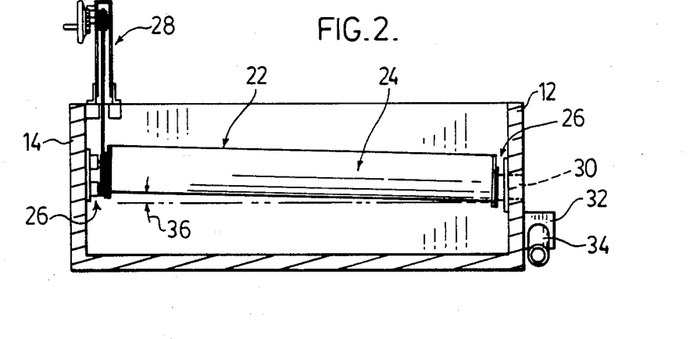
FIG. 2 is a section along the lines 2—2 of FIG. 1 demonstrating the extent of tilt for the trough as mounted in the tank.

As shown in FIG. 2, the trough 24 is sloped from one end to the other as indicated by the angle at 36 to encourage liquids skimmed off the top of the tank to flow towards the outlet port 30 for removal by collector 32. The bearing assemblies 26 for mounting the trough on the opposing side walls 12 and 14 must have facility to permit this tilting of the trough arrangement. It is appreciated, of course, that the trough 24 need not extend across the entire width of the tank 10. There are many applications where the tank width is far too great to permit the entire width to be spanned by a single trough. In those situations, a central supporting post or several spaced-apart posts are provided in the tank whereby individual troughs are supported at their ends and possibly in their mid-sections. The troughs then communicate by a series of outlet ports which flow into the next adjacent trough in a manner to be discussed with respect to FIG. 6.

The operation of the trough is shown in FIGS. 3 and 4. The trough 24, as shown in FIG. 3, is partly immersed in the liquid 20. The liquid 20 includes an upper layer 38 which is of either a waste material or a material to be recovered. The trough 24 is adapted to skim from the liquid 20 the upper layer 38. To accomplish this, the trough is rotated abouts its axis of rotation, as shown in FIG. 4, such that an upper edge 40 of the trough 24 is tilted just below the upper layer 38 such that it flows as illustrated at 38a to within the trough 24. The outlet of the trough at 30 then permits the collected upper layer 38 to flow outwardly, either when the trough is uprighted or held in the position of FIG. 4 to provide for a continuous removal of the scum layer 38 should it continue to flow into the trough 24. It is appreciated that trough 24 can be rotated in either direction depending upon its location in the tank to place either upper ridge 40 or 42 beneath the liquid layer to effect collection of the desired layer.

Figure 5:
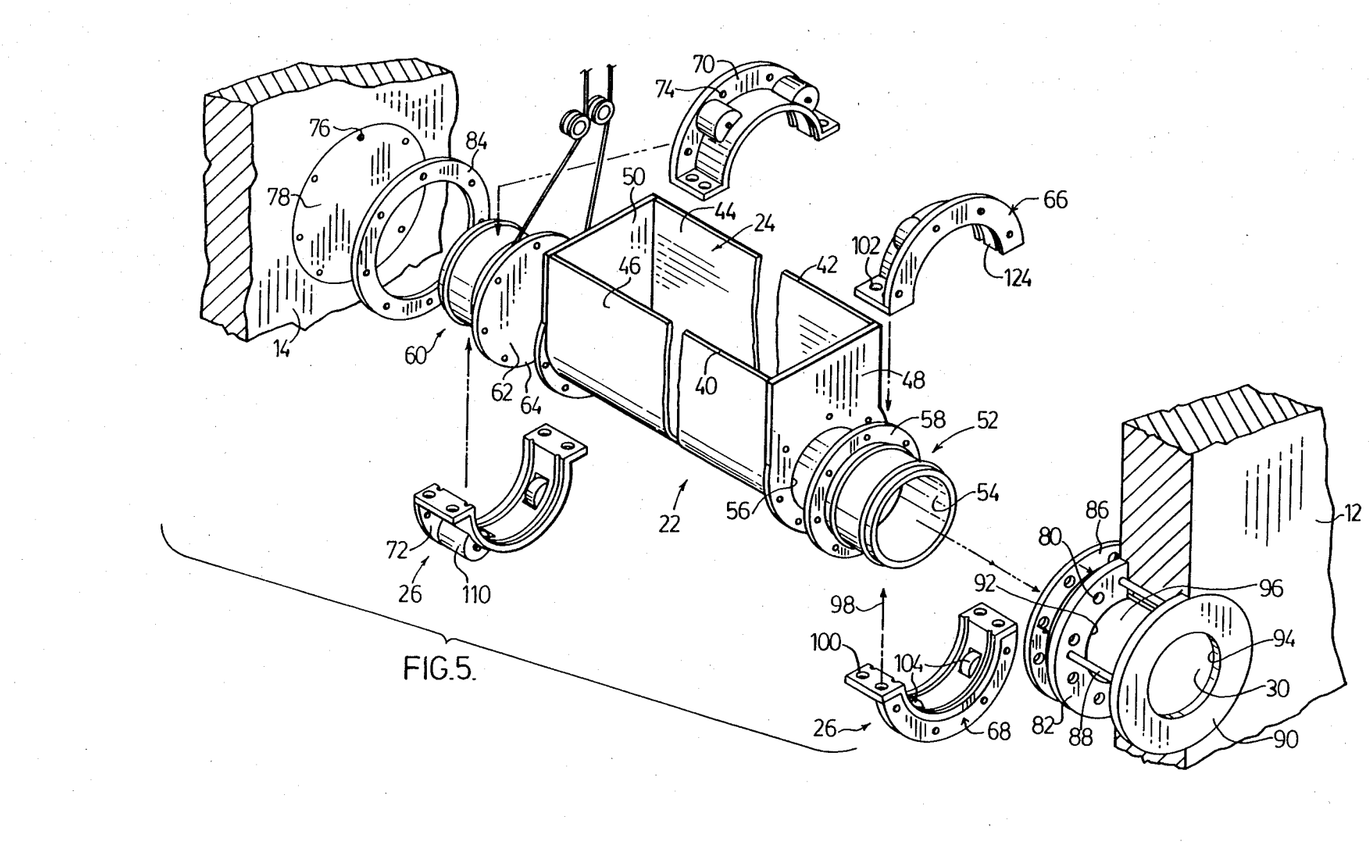
FIG. 5 is an exploded view in perspective of the trough assembly according to a preferred embodiment of the invention.

As shown in the exploded view of FIG. 5, the trough 24 is generally U-shaped having upper edges 40 and 42. The trough has opposing side walls portions 44 and 46 with end walls 48 and 50. The trough 24, as assembled, is substantially rigid to avoid appreciable flexing along its length when in use. The trough may be constructed of a variety of materials which include various forms of metals, such as steels and aluminum alloys which may be coated to resist corrosion. With some corrosive liquids, synthetic materials for the trough construction are suitable, such as fibreglass resins or glass reinforced polyolefins.

The trough 24 is provided with a cylindrical bearing sleeve 52 which, according to this embodiment, is fastened to the ends 48 and 50 of the trough 24. Sleeve 52, as attached to end 48, is hollow so as to include an inner opening 54 which is in communication with the opening 56 in the end wall 48 of the trough. Sleeve 52 includes a circular flange 58 which is bolted to the end wall 48. On the blind end 50 of the trough 24, the cylindrical beearing sleeve 60 may or may not be hollow and includes a solid plate 62 with outer flange 64 which is, in turn, bolted to the blind end 50 of the trough. An essentially identical bearing arrangement 26 is provided for engaging the cylindrical bearing sleeve portions 52 and 60 for supporting the trough in the tank.

Each bearing 26 includes a housing which, according to this preferred embodiment, is a split housing consisting of two half sections 66 and 68. Each half section includes flanges 70 and 72. The half sections are releasably secured together and when so secured about the cylindrical bearing sleeve 52 or 60, can be fastened to the respective side walls 12 and 14. The flanges 70 and 72 include a plurality of apertures 74 which are aligned with the apertures 76 in end plate 78 of wall 14, or apertures 80 in annular plate 82 of wall 12. The flanges 70 and 72 of the half sections of the bearing housing can then be bolted to the respective plates to mount the trough 24 within the tank 10. To seal the bearing housings to the end walls, annular seals 84 and 86 are provided to seal the flanges 70 and 72 against the respective plate portion. The purpose of the seal will be discussed with respect to FIG. 6.

The system shown in FIG. 5 for providing the mounting plate 82 for the bearing housing is particularly suited for the purpose. The plate 82 is attached by adjustable rods or the like 88 to a second annular plate 90. Adjustable rods 88 vary the distance between the plates 82 and 90. An internal sleeve 96 is placed between the opposing apertures 92 of plate 82 and 94 of plate 90 to enable one to locate the plates 82 and 90 between the formed walls which define the cavity into which the concrete of wall 12 is poured. In this manner adjustability between the plates 82 and 90 is provided, yet the system readily adapts itself to locating the plates with apertures 80 to which the bearing housing can be mounted. Similarly plate 90 may include apertures 80 to which another bearing 26 can be mounted should element 12 not be a side wall, but instead a supporting structure intermediate the width of the wall.

Figure 6:
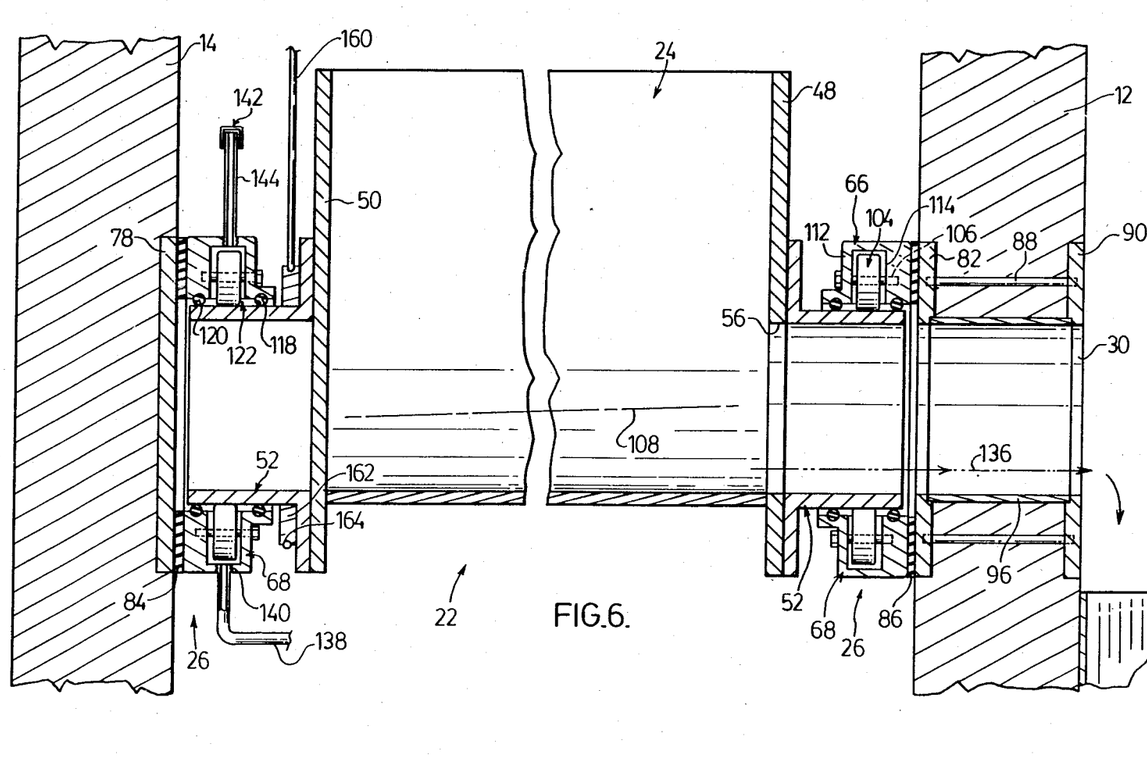
FIG. 6 is a section through the entire trough assembly as mounted in the tank of FIG. 1.

The assembled arrangement for the system of FIG. 5 is shown in FIG. 6. The bearing assemblies 26 are bolted to the respective plate portions 78 and 82 which in turn are embedded in the corresponding walls 12 and 14. The opening 56 in trough end 48 is in communication with the outlet 30. The liquid flows through the interior 54 of the cylindrical bearing sleeve 52 and through the internal sleeve 96 of the outlet 30. Seal 86 seals the connection of the bearing 26 to the plate 82 to ensure that the skimmed liquid does not permeate back into the tank area.

The half sections of the bearing housing 66 and 68 are assembled by bolting them together in the manner indicated by the arrows 98 in FIG. 5. Bolts pass through the corresponding apertures 100 and 102 in the bearing half sections to complete the assembly. According to this preferred embodiment, each housing half section includes two rollers 104 as shown in FIG. 5. Each roller is mounted to rotate about an axis concentric with roller axle 106 which is parallel to the axis of rotation of the trough indicated by line 108.

According to this embodiment, the axle 106 for the roller 104 is a bolt which is threaded through the housing section 66 or 68 to secure the roller in position within the housing. Each housing half section includes a recessed portion 110, as more clearly shown in FIG. 5, to accommodate the roller and provide the opposing wall portions 112 and 114 as more clearly shown in FIG. 6, for supporting the axle 106 for each roller. It is appreciated that any number of rollers may be used within the bearing housing. At least three rollers should be used to provide a stable arrangement for the trough 24 whether it be under load when containing a liquid, or under load due to the bouyancy force directed upwardly on the trough when the trough is empty.

Figure 7:
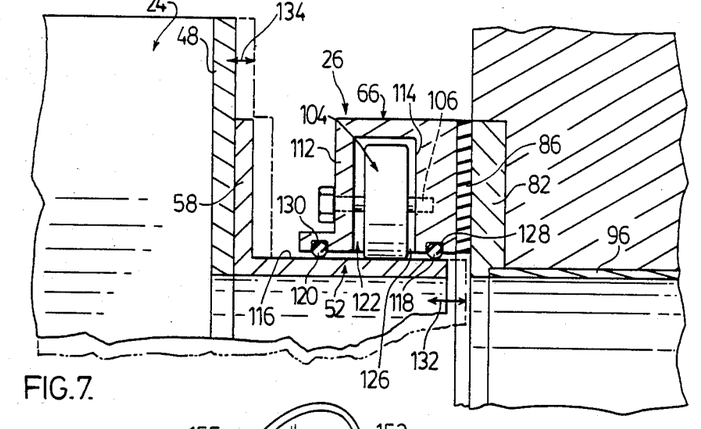
FIG. 7 is an enlarged view of the bearing and trough end portion of FIG. 6.

As shown in FIG. 7, a sealed cavity for the rollers 104 is provided to prevent contaminants of the tank liquid from seeping in around the rollers possibly corroding the rollers and/or their axles which could cause seizure or malfunction of the trough assembly. According to this preferred embodiment, a sealed cavity is formed between the housing for the bearing assembly 26 and the cylindrical bearing sleeve 52 of the trough which has an outer cylindrical surface 116. The preferred form of device for sealing the cavity is a pair of spaced-apart circular, resilient, flexible sealing devices 118 and 120. According to this embodiment, the seals 118 and 120 may be O-rings which are circular in cross-section and formed of a flexible resilient sealing material, such as natural or synthetic rubber. The O-rings are of an internal diameter slightly less than the external diameter of cylindrical sleeve 52. This snug fit for the O-ring ensures that the seal maintains its position during assembly. It is appreciated that many other sealing ring configurations and synthetic compositions may be used as is understood by those skilled in the art for the purposes of sealing the cavity generally designated 122 for the series of rollers 104.

All of the rollers 104 lie generally in the same plane relative to the rotational axis of the trough. The bearing housing half section 66 is provided with an internal circular face 124 as shown in FIG. 5, which includes the openings 126, as shown in FIG. 7, for the rollers 104. The circular face 124 includes two spaced-apart grooves 128 and 130 which oppose the circular face 116 of the cylindrical bearing sleeve 52. The O-ring seals 118 and 120 are placed on the cylindrical bearing sleeve 52 and positioned in alignment with the grooves 128 and 130. Upon assembly of the bearing housing half sections 66 and 68, the O-rings 118 and 120 are located in the grooves 128 and 130 where sufficient tightening of the half sections together forces the O-rings into the grooves of the housing sufficiently to form a seal on both sides of the roller 104 to thereby seal off the cavity 122.

It is appreciated that the sealing devices used in sealing the cavity 122 should be adapted to accommodate axial movement of the cylindrical bearing sleeve 52 as indicated by arrows 132 and 134. The axial movement is caused by thermal expansion and contraction in the trough 24. It is appreciated that the extent of axial movement is predetermined by the length of the trough and the thermal expansion coefficient of the metal used in the trough. The sealing arrangement for the cavity 122 should also be adapted to accommodate a tilting of the trough 24 to the extent shown in FIG. 2. The grooves 128 and 130 have been made somewhat deeper than one-half the diameter of the O-rings 118 and 120 to accommodate radial displacement of the O-rings 118 and 120 in tilting the trough to the extent shown in FIG. 2 to provide a liquid flow in the direction of arrow 136. It is appreciated that the width of each groove 128 and 130 in each bearing housing is slightly less than the cross-section diameter of the respective O-ring seals 118 and 120.

The cavities for the series of rollers include a substance which resists migration of impurities from the tank liquid into the roller assembly. That substance may be any non-water emulsifying material such as grease and oils. The cavity may be filled in advance with a heavy duty grease before assembly of the housing half sections, whereby the half sections provide a means by which the cavities can be prefilled. Alternatively, the half sections may be assembled as shown in FIG. 6 and a device provided for introducing a non-emulsifying substance into the sealed cavity 122. A conduit 138 is in communication with the sealed cavity 122 through connector 140 which extends through the bearing housing half section 68. A heavy duty oil or grease may be injected through the conduit 138 to fill the sealed cavity 122. A vent 142 may be provided for the sealed cavity 122 via conduit 144. When the cavity 122 is filled with grease or oil, it will be indicated by the substance flowing out of the vent 142. Providing the seals 118 and 120 are of suitable materials, there should be no need to replenish the non-emulsifying material within the cavity 122. This arrangement for filling the cavity of each bearing housing may be fed from a single position on the tank as shown in FIG. 1, where two conduits 138 and 146 feed grease or oil to the respective bearing seal cavity in the manner discussed with respect to the bearing housing of FIG. 6.

The series of rollers 104 are spaced about the periphery of the cylindrical sleeve 52 to contact the outer circular surface 116 to maintain stability of the trough within the tank and resist forces from all directions on the trough either caused by loads exerted on the trough when containing a liquid, or the bouyancy force of the tank liquid. It is appreciated that the rollers need not all be in direct contact with the trough at any one time and that ideally some play is left between the rollers and the cylindrical surface to provide for the tilting of trough and/or the axial expansion and contraction of the trough. As already discussed with respect to the roller arrangement, normally at least three rollers are used where with any roller arrangement, rollers are provided in the upper region to resist the bouyancy forces of the tank liquid on the empty trough.

With the trough assembly complete and installed, as discussed with respect to FIGS. 3 and 4, it is necessary to rotate the trough from time to time to effect the skimming of the upper layer of liquid or floating debris. The preferred mechanism for rotating the trough is a hand wheel arrangement 28. As shown in more detail in FIG. 8, a handle 148 is connected to a wheel 149 which drives a sprocket 152 through axle 150. Idler wheels 154 and 156 are provided at the base 158 of the hand wheel assembly 28. The base 158 is secured in an appropriate manner to the tank wall 14. A length of chain 160 is trained over sprocket 152. The chain 160 has its ends connected to wire cable 161 by connectors 163. The wire cable 161 is trained on idler pulleys 154 and 156 and around cylindrical bearing sleeve 52 of trough end 50. As shown in FIG. 6, the cylindrical bearing sleeve 52 includes an annular ring 162 having a groove 164 formed therein around which the cable 161 is trained and to which the cable 161 is fastened. Sufficient tension is placed in the cable 161 such that by engagement of the cable with the ring 162 and rotation of the handle 148, the trough can be rotated in the manner illustrated in FIGS. 3 and 4. This arrangement provides for a positive drive between the sprocket 152 and the trough ring 162 to prevent any slippage when rotating the trough. When it is desired to position the trough at any desired set angular position, a lock may be provided for the wheel 149. According to the embodiment of FIG. 8, the lock comprises a movable spring-loaded lever 153 with lug 155 for engaging teeth on ring 151. Upon release of the lever 153, the lug 155 engages the adjacent tooth of ring 151 to hold the trough in that set angular position. This lock may also be used to stabilize the trough in the upright position.

Figure 8:
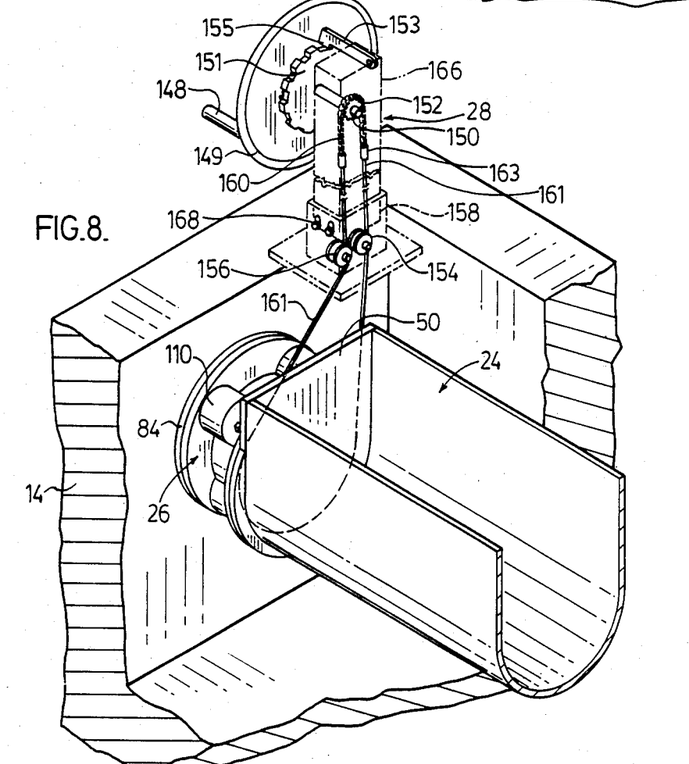
FIG. 8 is a perspective view of the trough end including the trough end bearing and rotating mechanism.

It is appreciated that the cable 161 may be replaced with an endless chain trained over sprocket 152, over pulleys 154 and 156 and around ring 162 which, instead of having a groove 164, it has a plurality of sprocket teeth to engage the endless chain.

To adjust the tension on the chain or cable, the standard 166 is vertically adjustable by way of lock bolts 168. By increasing the height of the drive pulley 152, tension on the chain or cable 161 can be increased to provide the needed engagement with the ring or sprocket 162 to effect rotation of the trough 24. Such adjustment may be needed from time to time as the chain or cable 161 stretches. This arrangement provides a maintenance free, readily manufactured assembly for rotating the trough. It is appreciated, however that many other forms of drives may be used for rotating the trough, such as a levered operating arm, rack and pinion and other gearing arrangements. It is also appreciated that a motor drive may be used in association with the sprocket, chain or cable system of FIG. 8, or gearing arrangements to effect rotation of the trough particularly in situations where frequent rotation of the trough in skimming the tank liquids is required. With an automated drive mechanism, timing devices and limit switches are needed to control the tilting angles, dwell time during the skimming action and frequency of operation.

By use of the bearing device, according to this invention, which include anti-friction, non-corrodable rollers, there is a significant reduction in turning effort and torsional twisting in rotating the trough. This reduces torque required to turn the trough in the end bearing assemblies, particularly the end remote from the drive end. Increased life for the anti-friction rollers is provided by the use of a non-emulsifying lubricant within the sealed cavities for the rollers. As mentioned the rollers also provide for axial movement in and sloping of the trough. Furthermore, misalignment during installation is accommodated by the bearing assemblies so that precision mounting of the trough in the tank is avoided. Although not shown in FIG. 1, it is appreciated that a flushing device may be used in combination with the U-shaped trough to flush out of the trough the contents after skimming.

Figures 9, 10, 11:
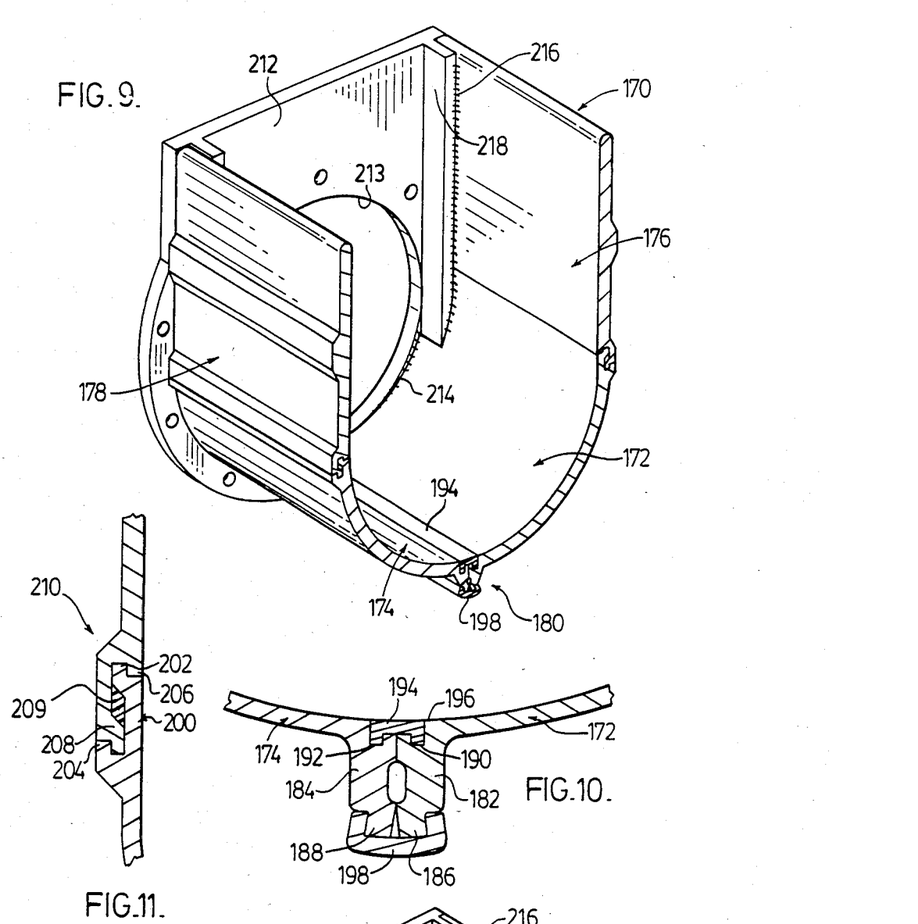
FIG. 9 is a section through a trough fabricated from extruded sections.
FIG. 10 is an enlarged view of the bottom portion of the trough of FIG. 9 showing interlocking connection of the circular extruded segments.
FIG. 11 is an enlarged view of the interlocking connection of the extruded side wall to a circular extruded segment of the trough of FIG. 10.

The trough assembly, according to this invention, may include an the use of extruded segments for the trough as shown in FIG. 9. The extruded arrangement for the trough 170 has the U-shaped construction made up of individual extruded segments. The trough 170 includes two bottom circular segments 172 and 174 with opposing interconnecting upright walls 176 and 178. Both the circular and upright wall portions may be of identical cross-section, thereby necessitating the manufacture of only two extrusions to form a completed trough assembly 170. The circular segments 172 and 174 include a configuration at their lower part 180 to allow clipping of the circular segments together.

As shown in FIG. 10, segments 172 and 174 include depending flanges 182 and 184 with outwardly directed lugs 186 and 188. Recesses 190 and 192 are provided on the interior adjacent portions of the circular segments 172 and 174 to receive a U-shaped clip 194 for clipping the opposing flanges 182 and 184 together on the inner surface 196 of the circular segments. To complete the connection, a U-shaped clip 198 is used to connect the depending wings 186 and 188 together to bind thereby both the inner and outer portions of the circular segments to provide a stable arrangement along the length of the assembled trough 170. As shown in FIG. 9, the clips 194 and 198 may extend along the length of the trough tc provide a smooth interior finish and assure an even distribution of forces in clipping the trough segments together along the bottom.

Each circular segment 172 and 174 includes an upper edge 200 with first and second projections 202 and 204 which receive a corresponding set of projections 206 and 208 of the lower portion 210 of each side wall segment 176 and 178. The upper edge 200 of each circular segment is adhesively secured to the lower edge of each side wall segment by an adhesive 209. As shown in FIG. 9, the assembly is completed by welding the end plates 212 to the circular segments by way of fillet welds 214 and to the side walls 176 and 178 by fillet welds 216. The end plate 212 includes flanges 218 to receive the edges of the side walls 176 and 178 and provide a surface for the welding attachment. An opening 213 is provided in the end plate 212 to provide an outlet for the completed trough.

Figure 12:
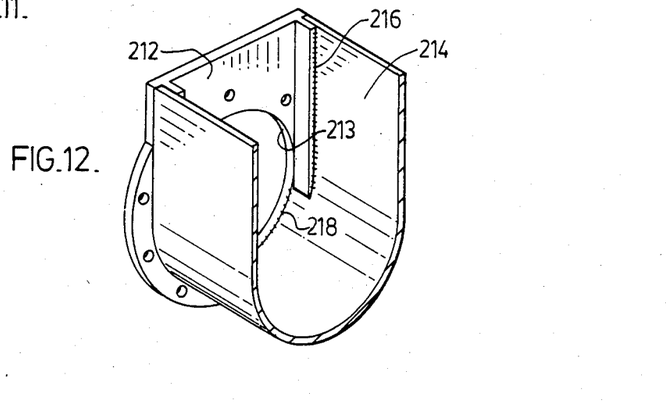
FIG. 12 illustrates another embodiment of the invention showing the end assembly of a trough formed of rolled metal.

As shown in FIG. 12, the end plate 212 may be similarly used with a rolled steel or aluminum trough section 214 where fillet welds 216 for the side wall portions of the U-shaped trough and 218 for the circular bottom portion of the U-shaped trough to effect connection and completion of the trough assembly.

It has been found that by manufacturing the trough from extruded segments, there is a considerable cost reduction in the assembly of the trough, when considered from the standpoint of longer length troughs, for example, 20 to 25 feet which are very difficult to form from a rolled sheet of steel or aluminum alloy. With the extrusion arrangement, any desired length of trough can be readily fabricated, shipped in a knock-down form and clipped together and welded at the site for installation.

Although preferred embodiments of the invention have been described herein in detail, it is understood by those skilled in the art that variations may be made thereto without departing from the spirit of the invention or the scope of the appended claims.

The embodiments of the invention in which an exclusive property or privilege is claimed are defined as follows:

1. A bearing assembly comprising means for mounting a skimming trough in an upper region of a tank for rotation in skimming a liquid layer from an upper region of tank contained liquid, said bearing assembly having a housing with an opening to receive a cylindrical bearing sleeve portion of a skimming trough, at least three spaced-apart rollers being mounted within said housing for contacting a cylindrical bearing sleeve portion of a skimming trough, each of said rollers being mounted in said housing to rotate about an axis which extends in a direction generally parallel to an axis of rotation for a skimming trough mounted in said bearing, said rollers being arranged about said housing opening relative to said axis of rotation of a skimming trough, said rollers being arranged in said housing to position at least one roller in the upper region of said housing when in sue on a skimming trough, said housing having a sealing means for sealing said rollers within a sealed cavity defined between said housing and a cylindrical bearing sleeve of a skimming trough mounted in said bearing assembly, and means associated with said housing for permitting insertion into said cavity of a substance for resisting migration through said sealing means of impurities from tank contained liquid.

2. A bearing assembly of claim 1, wherein said housing is split into opposing sections and means for releasably securing said opposing sections together.

3. A bearing assembly of claim 1, wherein said sealing means is adapted to permit axial movement of and sloping of a cylindrical bearing sleeve of a skimming trough mounted in said bearing assembly.

4. A bearing assembly of claim 1, wherein said rollers are symmetrically arranged about said axis of rotation of a skimming trough.

5. A rotatable skimming trough assembly comprising means for mounting in an upper region of a tank to skim a liquid layer from an upper region, of a tank contained liquid, said trough assembly including a trough of a length to extend across at least a portion of a tank and bearing means for mounting each end portion of said trough to structure of a tank, a cylindrical sleeve being associated with each of said trough end portions, said cylindrical bearing sleeve having an outer surface concentric with an axis of rotation for said trough said bearing means comprising a housing having a generally cylindrical opening through which said trough cylindrical bearing sleeve extends, at least three rollers mounted in said housing about said cylindrical opening and arranged to contact said cylindrical bearing sleeve, said rollers being arranged about said trough axis of rotation with at least one roller in the upper region of said housing when supporting said trough on a tank, each of said rollers rotating about an axis which is generally parallel with said trough axis of rotation, means for sealing said rollers, said sealing means extending around said housing and in circumferential contact with said sleeve outer surface to define a sealed cavity between said housing and said sleeve outer surface, means associated with said bearing means or said trough for permitting insertion into said cavity of a substance for resisting migration through said sealing means of impurities from tank contained liquid and said trough assembly including means to facilitate rotation of said trough about its axis of rotation.

6. A trough assembly of claim 5, wherein said sealing means is adapted to permit axial movement of or sloping of said trough cylindrical bearing sleeve.

7. A trough assembly of claim 6, wherein said rollers are circumferentially aligned, said housing including two cylindrical inner faces, one on each side of said rollers, said cylindrical inner faces opposing said sleeve outer surface, said sealing means being provided between said opposing inner faces and said sleeve outer surface.

8. A trough assembly of claim 7, wherein said sealing means on each side of said rollers is a ring seal of flexible, resilient sealing material.

9. A trough assembly of claim 7, wherein said housing is split into two half sections and means for releasably securing said half sections together.

10. A trough assembly of claim 9, wherein said sealing means is provided on said sleeve outer surface to facilitate assembly of said bearing means half sections.

11. A trough assembly of claim 10, wherein said sealing means on each side of said rollers is a ring seal of flexible, resilient sealing material, said ring seal having an internal diameter slightly less than an external diameter for said sleeve outer surface.

12. A trough assembly of claim 11, wherein said cylindrical inner face on each side of said rollers includes a groove extending around said inner face to receive said corresponding ring seal.

13. A trough assembly of claim 9, wherein four rollers are provided, two of said rollers being provided in each said half section, said housing half section including a pocket recess to receive each roller, said pocket recess having opposing walls with an axle mounted therebetween, a corresponding said roller rotatably mounted on said roller, said axle extending generally parallel with said trough axis of rotation.

14. A trough assembly of claim 7, wherein said cylindrical trough sleeve of at least one end of said trough is hollow.

15. A trough assembly of claim 5, wherein said means for permitting insertion of said substance comprises a conduit connected to said housing and in communication with said cavity, said substance being injected into said cavity through said conduit.

16. A trough assembly of claim 5, wherein said housing includes means for securing said bearing means to structure of a tank, said securement means comprising a planar flange with a plurality of apertures to permit fastening said flange to a planar surface of tank structure, a seal being provided on said flange.

17. A trough assembly of claim 16, wherein a passageway is provided through a tank wall, said assembly including a plate having an opening for communicating with said passageway in a tank wall, said flange of said housing being fastened to said plate, said seal being provided between said housing flange and said plate.

18. A trough assembly of claim 5, wherein said means to facilitate rotation of said trough includes means for engaging said trough cylindrical bearing sleeve to rotate said trough about its axis of rotation.

19. A trough assembly of claim 18, wherein said trough rotation means comprises a drive sprocket, a drive loop engaging said drive sprocket and engaging said trough cylindrical bearing sleeve to rotate said trough when said drive sprocket is rotated.

20. A trough assembly of claim 19, wherein said hand wheel rotates said sprocket, means for locking said wheel in any desired angular position to set thereby an angular position for said trough.

21. A trough assembly of claim 19, wherein said drive loop comprises a section of chain trained over said sprocket, said section of chain having two end portions which are connected to a section of cable, said cable completing said drive loop and being fastened to a portion of said cylindrical bearing sleeve.

22. A trough assembly of claim 19, wherein said drive loop is an endless chain, said cylindrical bearing sleeve having a chain sprocket associated therewith, said chain being trained over said drive sprocket and said sprocket on said trough.

23. A skimming trough comprising means for use in skimming a liquid layer from an upper region of a tank contained liquid, said trough being generally U-shaped in cross-section and extending appreciably in length to span supporting structures of a tank, said trough including an assembled plurality of extruded aluminum, alloy sections consisting of opposing bottom circular segments and opposing upright side wall sections, said circular segments being of identical cross-section and said upright side wall sections being of identical cross-section, said circular segments having edge portions adapted for connection to one another along trough lower portion and remaining edge portions adapted for connection to said trough side walls.

24. A skimming trough of claim 23, wherein said circular segments are clipped together internally and externally of said trough to provide an essentially stable clipped structure for the trough circular segments.

* * * * *